United States Patent [19]

Wood

[11] 4,035,121

[45] July 12, 1977

[54] MACHINE FOR FORMING LIGNOCELLULOSIC FIBER MATS

[75] Inventor: Dennis E. Wood, Rochester, N.Y.

[73] Assignee: Rando Machine Corporation, Macedon, N.Y.

[21] Appl. No.: 661,350

[22] Filed: Feb. 25, 1976

[51] Int. Cl.[2] .............................................. B29J 5/00

[52] U.S. Cl. .................................... 425/83; 425/224

[58] Field of Search ...................... 425/83, 223, 224

[56] References Cited

U.S. PATENT DOCUMENTS

| | | | |
|---|---|---|---|
| 3,356,780 | 12/1967 | Cole | 425/83 X |
| 3,671,210 | 6/1972 | Richardson | 425/83 X |
| 3,737,265 | 6/1973 | Schafer et al. | 425/83 X |
| 3,792,943 | 2/1974 | Helgesson | 425/83 |

*Primary Examiner*—J. Howard Flint, Jr.
*Attorney, Agent, or Firm*—Shlesinger, Fitzsimmons & Shlesinger

[57] ABSTRACT

Resin treated lignocellulosic fibers are conveyed by a stream of air downwardly to a separator containing one or more doffing rolls, which rotate adjacent a perforated scroll assembly. At the side opposite the doffers the assembly is connected to a vacuum supply which draws dust and foreign particles out of the fibers as they fall downwardly through the separator and into a hopper located in the rear of a feeder assembly housing. From here the fibers are fed by endless belts or aprons to an expansion chamber formed in the rear of a condenser housing containing one above the other a pair of endless condensers or screens. The fibers cascade downwardly in the expansion chamber to a generally wedge-shaped air bridge formed at the inlet end of the space formed between the confronting runs of the condensers. This space is connected to a pair of suction fans so that the fibers are slightly compacted as they are sucked by the fans through the throat of the air bridge and deposited on the confronting runs of the screen condensers. These two runs travel continuously toward the discharge end of the housing to produce an endless mat of fibers at the output. The upper belt is also mounted for vertical adjustment to vary the thickness of the mat.

18 Claims, 5 Drawing Figures

MACHINE FOR FORMING LIGNOCELLULOSIC FIBER MATS

This invention relates to the production of fiberboard, and more particularly to a machine for producing a resin treated lignocellulosic fiber mat in continuous form.

There are several known processes for producing wood fiberboard from resin treated lignocellulosic fibers. Usually these processes are classified as either a wet or a dry method. In a typical wet method the raw material, such as wood fibers or chips, is softened by heat and/or chemicals and is disintegrated into a wet pulp, which is suspended in water. The fibers are then allowed to sediment out to form uniform pulp webs, which are then divided and pressed under high pressure into dry, rigid slabs.

With the dry method, the disintegrated chips or fibers are dried and then suspended in air, and are sedimented or otherwise formed into a pulp web, which is thereafter divided into dry sheets. These sheets are then compressed under high temperature and pressures into rigid, dry slabs. Typically in such a dry process the lignocellulosic fibers are treated with a resin binder, before being formed into a web, so that after the web has been formed and divided into sheets, the resin can be activated by the application of heat and pressure to bind the fibers into the final fiberboard form.

The instant invention is concerned with the formation of a fiber web or mat from lignocellulosic fibers, which have been previously treated with a resin binder. These resin treated fibers, in dry form, are manipulated by the machine hereinafter described so as continuously to form a uniformly thick mat of compressed fibers. This mat can be cut into separate sheets and subjected to high pressure and/or temperature to activate the binder in the fibers to form the final, rigid fiberboard.

One of the major problems heretofore encountered in producing dry lignocellulosic fiber mats of the type described has been the difficulty in securing uniform mat thickness throughout the length and breadth of the mat. This non-homogeneity can be the result of several factors, including the use of poorly prepared fiber (lumpy or containing foreign particles), improper feed rate of the fibers, and improper compaction of the mat, among others.

It is an object of this invention to provide an improved machine for a dry method of continuously forming from resin treated lignocellulosic fibers a uniformly thick fiber mat of the type that is used for producing wood fiberboard and the like.

A further object of this invention is to provide a novel machine for continuously separating and distributing resin treated lignocellulosic fibers into a uniformly thick mat free from undesirable voids and fiber clusters.

Still another object of this invention is to provide a machine of the type described which is suitable for use with an extremely wide range of fibers that are employed to manufacture wood fiberboard and the like.

Another object of this invention is to provide a forming machine of the type described which is adjustable accurately to control the thickness of the fiber mat produced thereby.

Other objects of the invention will be apparent hereinafter from the specification and from the recital of the appended claims, particularly when read in conjunction with the accompanying drawings.

Figure 2:
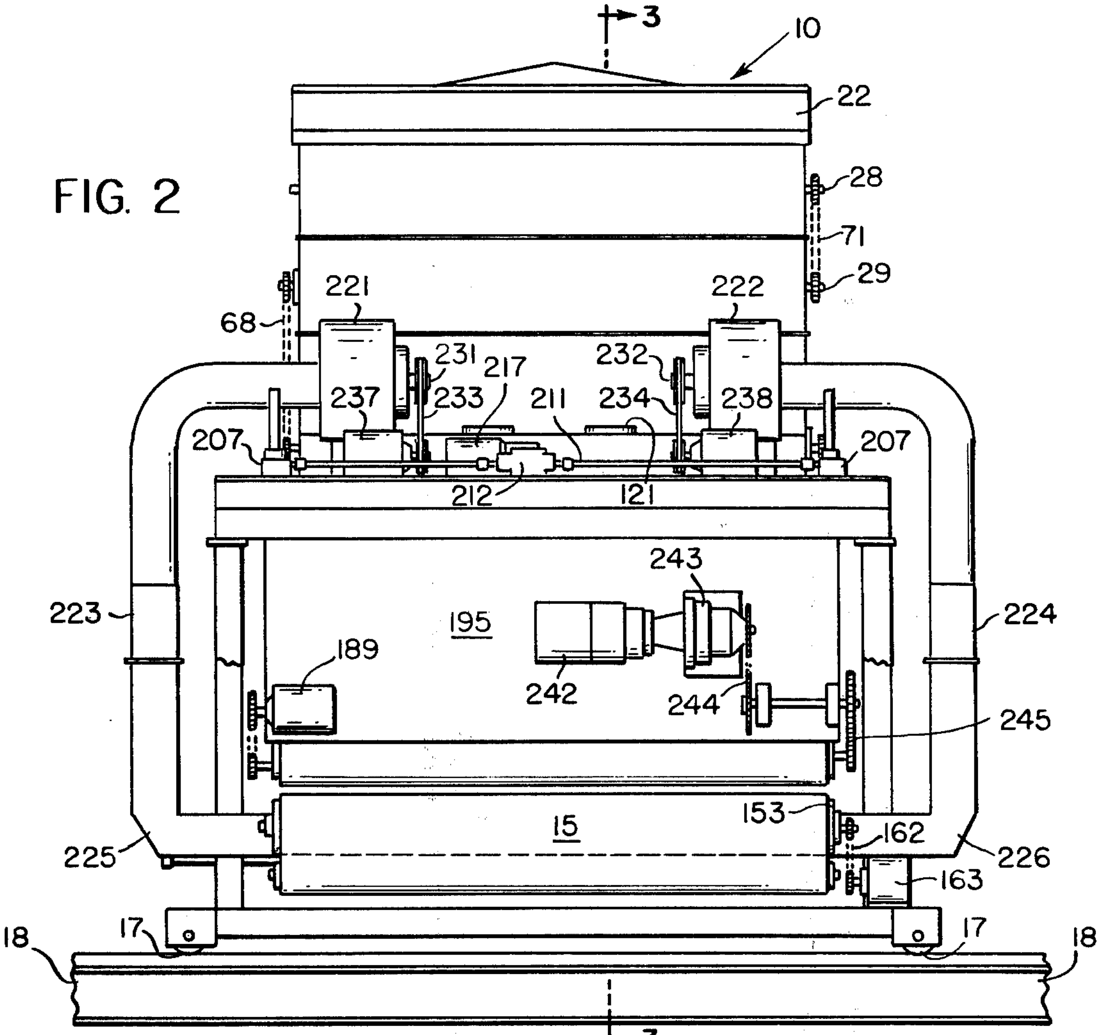
FIG. 2 is a fragmentary front elevational view of this machine.
Figure 4:
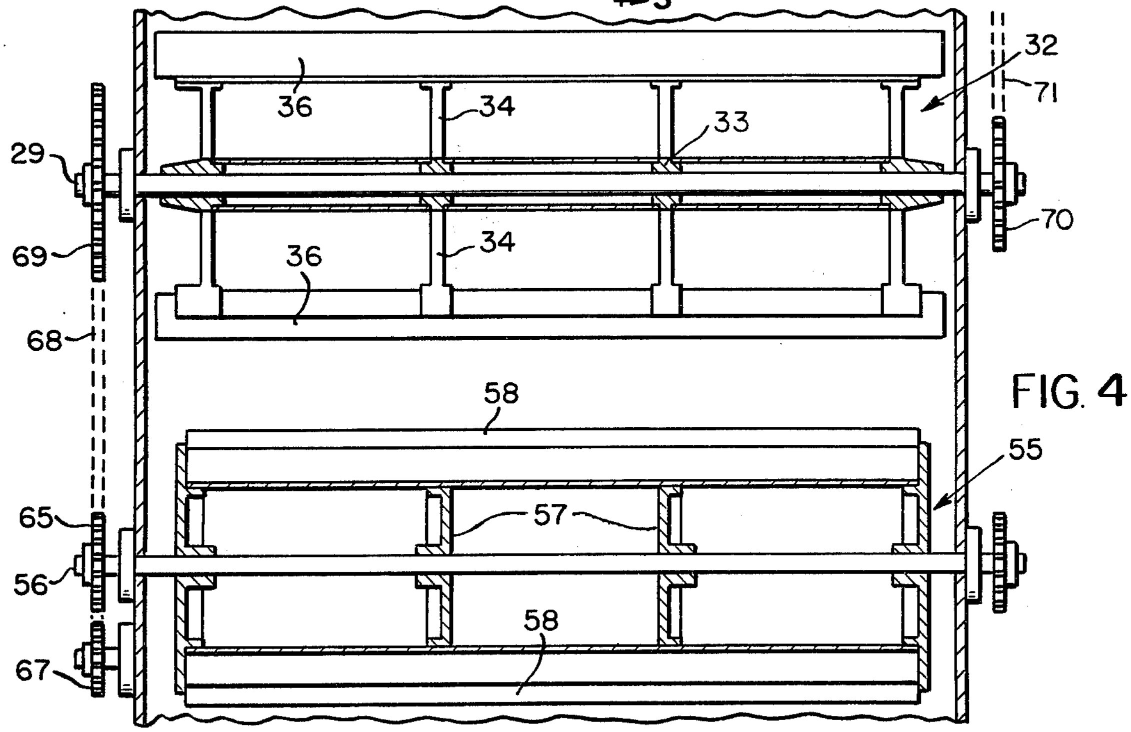
Figure 3A:
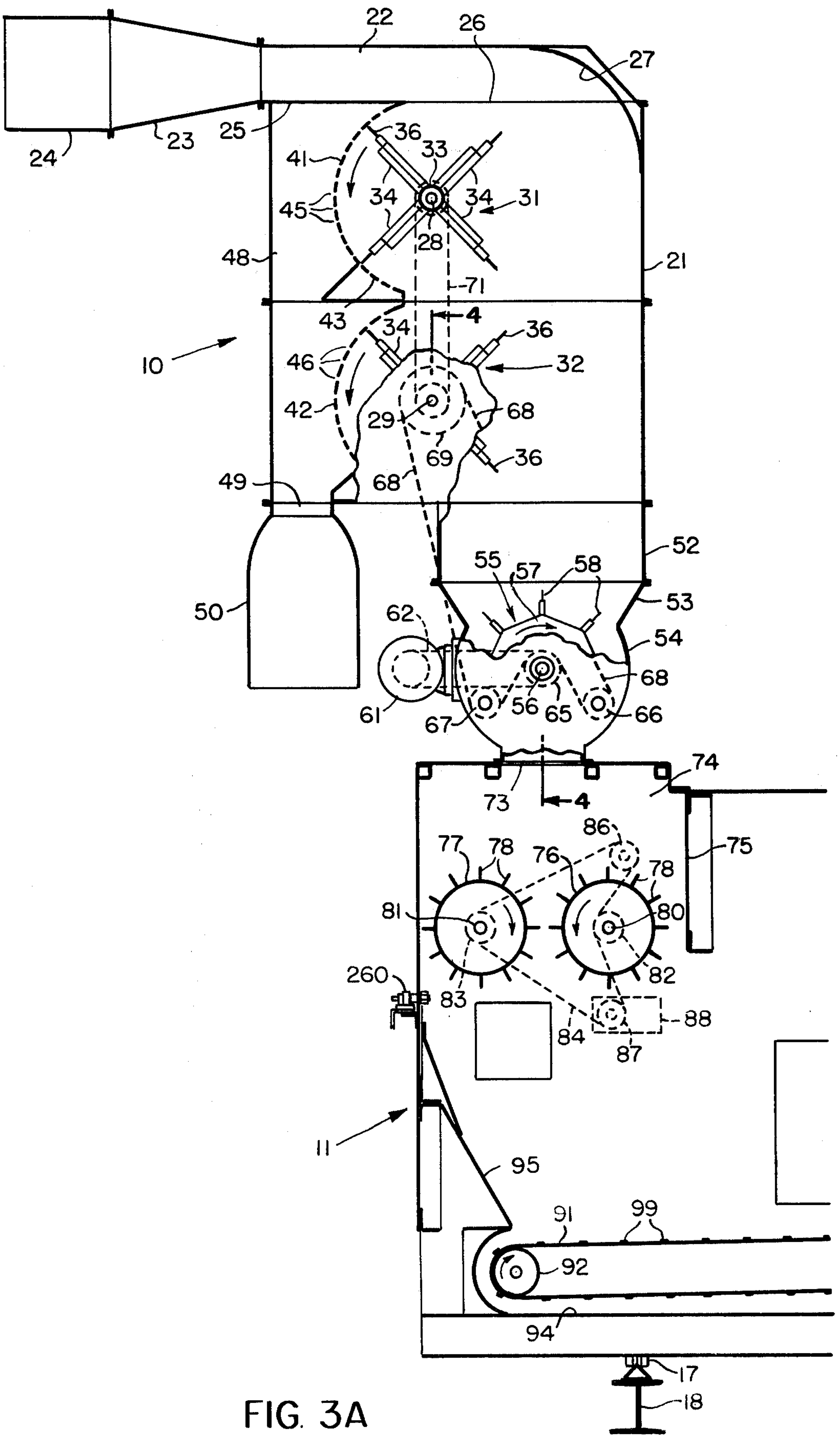
Figure 3B:
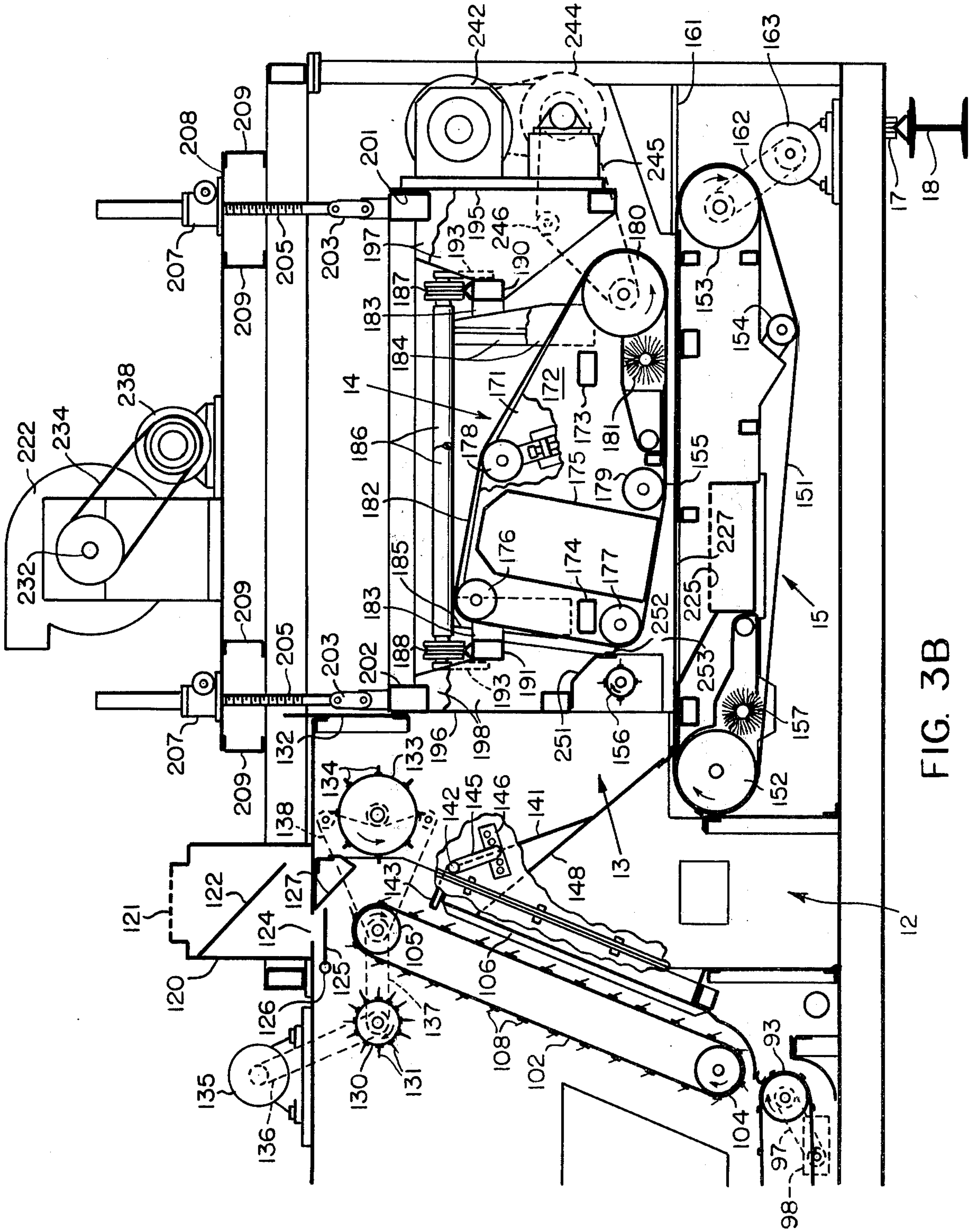

FIGS. 3A and 3B form matching halves of an enlarged fragmentary sectional view of this machine taken along the line 3—3 in FIG. 2 looking in the direction of the arrows; and FIG. 4 is an enlarged fragmentary sectional view taken along the line 4—4 in FIG. 3A looking in the direction of the arrows.

Referring now to the drawings by numerals of reference, and first to FIGS. 3A, and 3B, 10 denotes generally a separator section of the machine where incoming, resin treated fibers are separated from a pneumatic air stream which is used to convey the fibers to one or more such machines in a system thereof. From the separator 10 fibers are fed into the housing 11 of a feeder assembly, which feeds the fibers forwardly and upwardly to an expansion chamber which is formed in the rear of a condenser housing 12 which is positioned in front of housing 11. Housings 11 and 12 are supported by wheels 17 on a pair of stationary floor beams 18. From the expansion chamber the fibers are fed downwardly into a generally wedged-shaped "air bridge" 13, where they are compacted and drawn by vacuum between the confronting runs of upper and lower condensers units 14 and 15, respectively, which further compact and discharge the fibers from the front of the machine (right end in FIG. 3B) in the form of a fiber mat.

The separator 10 comprises a generally rectangular, metal housing 21 (FIG. 3A), which is mounted above the rear end of the feeder assembly 11. Mounted on top of housing 21 is a horizontally disposed fiber inlet duct 22, which is connected at its rear or outer end by a flared conduit 23 with a fiber supply duct 24. The underside 25 of duct 24 projects only part way into housing 21 toward its front wall, so that a large fiber inlet opening 26 is formed in the bottom of the duct at its inner end. Fibers that are fed to duct 24 strike a curved wear plate 27 which is positioned at the inner end of the duct, and are thus discharged downwardly through opening 26 into housing 21 as noted hereinafter.

Journaled at opposite ends in the opposed side walls of housing 21 for rotation about spaced, parallel, horizontally disposed axes are the shafts 28 and 29 of two, identical, rotatary doffers or wiper drums 31 and 32, respectively. Each doffer comprises a plurality of spoked hubs 33 (FIGS. 3A and 4) which are secured to shafts 28 and 29 at axially spaced points therealong. On each shaft these hubs 33 are arranged so that their radially projecting arms or spokes 34, which extend at right angles to each other, form four series of axially-aligned arms. Secured to the outer ends of each series of arms 34 is an elongate wiper blade 36, which is made from a strip of rubber flashing, or the like. The four blades 36 on each drum thus extend parallel to each other between the sides of housing 21.

The doffer drums 31 and 32 are partially enclosed or surrounded coaxially by semi-cylindrical partitions or scroll assemblies 41 and 42, respectively, (FIG. 3A) which extend transversely and one above the other between opposite sides of housing 21 rearwardly of the drums 31 and 32, and in spaced relation to the rear wall of the housing. These partitions 41 and 42 are positioned so that the wiper blades 36 of the associated doffers will have sweeping or sliding contact with their inner peripheral surfaces. Except for minor, imperforate portions 43 adjacent the lower edges thereof, the partitions 41 and 42 have therethrough closely spaced holes 45 and 46 which connect the space in housing 21 at the right hand side of the partitions with a vertical vacuum chamber 48, which is formed in housing 21 at the left side of the partitions 41 and 42 beneath the section 25 of duct 22. This chamber 48 is connected through an opening 49 in the bottom of housing 21 with a conduit 50, which is adapted to be connected to a vacuum supply or suction source for a purpose noted hereinafter.

Forwardly (to the right in FIG. 3A) of drums 31 and 32 the lower end of housing 21 is connected by a vertical duct 52 with the hopper-shaped upper end 53 of a cylindrical housing 54, which extends transversely across housing 11 above its rear end. Mounted to rotate in housing 54 about an axis parallel to those of the doffers 31 and 32 is a vacuum drum 55. This drum comprises a shaft 56 (FIG. 4), opposite ends of which are rotatably journaled in opposite ends of housing 54, and a plurality of spiders 57, which are secured to shaft 56 at axially spaced points therealong. Secured to the outer surfaces of the spiders 57 and projecting radially therefrom are a plurality of axially-extending wiper blades 58, which are equiangularly spaced from one another about the axis of shaft 56. When the shaft 56 is rotated, as noted hereinafter, the blades 58 have sweeping, sliding engagement with the inner peripheral surface of housing 54.

The shaft of an electric motor 61 (FIGS. 1 and 3A), which is mounted on a bracket at one end of housing 54, is drivingly connected by a belt 62 to the input of a conventional speed reducing unit (not illustrated), which is connected in known manner to one end of the vacuum drum shaft 56 to impart rotation thereto. The opposite end of shaft 56 projects exteriorly of the housing 54 and has secured thereon a sprocket wheel 65 (FIGS. 3A and 4). Two idler sprockets 66 and 67, which are mounted to rotate on this end of housing 54, are connected by a chain 68 to sprocket 65, and to a further sprocket wheel 69, which is secured to the adjacent end of the lower doffer shaft 29 exteriorly of housing 21. Chain 68 passes over the top of wheel 65 and beneath the adjacent idler sprockets 66 and 67 before passing over wheel 69, so that the lower doffing roll 32 is driven in a direction opposite to that of the vacuum drum 55, as shown by the associated arrows in FIG. 3A. Both of the doffer shafts 28 and 29 project from the opposite end of houing 21 and have thereon sprocket wheels 70 which are connected by a chain 71 (FIGS. 4 and 3A), which transmits the rotation of the lower doffing shaft 29 to the upper shaft 28 so that the doffing rolls 31 and 32 rotate in unison, and in the same direction.

Housing 54 is fastened at its lower end on the rear end of the feeder housing 11, and communicates through an elongate opening 73 (FIG. 3A) in the bottom thereof with a chute or hopper 74, which is formed in the upper end of housing 11 between its rear wall and a transverse partition 75 which projects downwardly from the top of the housing forwardly of opening 73. Mounted to rotate in the lower end of chute 74 beneath opening 73 and in spaced, parallel relation are two, spiked feed rolls 76 and 77, each of which has a plurality of radial pins or spikes 78 projecting from its outer peripheral surface. These rolls are secured to shafts 80 and 81, respectively, opposite ends of which are rotatably journaled in opposite sides of housing 11. The shafts 80 and 81 project at one end exteriorly of the housing 11 and have fastened thereon sprocket wheels 82 and 83 which are drivingly connected to a chain 84. This chain passes about an idler sprocket 86, and a drive sprocket 87, which is driven by a motor 88 that is mounted on one side of housing 11. Sprockets 86 and 87 are positioned so that the spiked feed rolls 76 and 77 are driven in opposite directions as indicated by the arrows in FIG. 3A.

The two feed rolls 76 and 77 are positioned so that the nip or space therebetween registers with the rear end of an endless floor apron or conveyor belt 91 (FIG. 3A), which is mounted to travel about a pair of spaced rolls 92 and 93, which are journaled at opposite sides of the housing 11 to rotate just above its floor plate 94. Roll 92 is adjustably mounted adjacent the rear wall of the housing 11 beneath an inclined guide plate 95, which projects from the rear wall of housing 11 to overlie the rear end of belt 91. Drive roll 93 is mounted in the usual manner somewhat higher off the floor than the roll 92, and is connected by sprocket wheels (not illustrated) and a chain 97 to the drive shaft of the motor 98, which is mounted at one side of the housing 11. When energized, motor 98 drives roll 93 in the direction indicated by the arrow in FIG. 3B, so that the upper reach of belt 91 travels toward the right. Projecting from the face of belt 91 are a plurality of transversely extending slats 99, which convey fibers forwarding in housing 11 as noted hereinafter.

At its forward end the floor apron 91 registers with the lower end of an inclined elevating apron or conveyor 102 (FIG. 3B) of conventional design, which is mounted to travel about a pair of rolls 104 and 105. These rollers are journaled in opposite sides of housing 11 adjacent an inclined plate 106, which extends transversely across housing 11 adjacent its forward end. The rolls support the apron 102 so that its outer or left hand reach (FIG. 3B) travels upwardly from roll 104 to 105 in a direction inclined slightly to the vertical. Projecting from the surface of apron 102 are plurality of spaced pins 108, which, as taught for example in U.S. Pat. No. 2,890,497, are inclined in the direction of travel of the belt to convey fibers upwardly over the top of roll 105 as noted hereinafter.

The upper roll 105 is mounted beneath an air plenum 120, which extends transversely across the top of housing 11 adjacent its junction with housing 12. The plenum has in its upper end a plurality of screened openings 121 (FIG. 1) for admitting air to the plenum, and contains an inclined plate or baffle 122 which extends diagonally and part way downwardly into the plenum from one side wall thereof. Baffle 122 projects beneath the openings 121, and across a transverse port or opening 124, which is formed in the top of housing 11 to admit air from the plenum. Mounted between the upper apron roll 105 and the opening 124 is an adjustable throttle plate 125, which is secured along one edge to a shaft 126. This shaft is journaled in opposite sides of housing 11 for pivotal movement by a handle (not illustrated) to swing plate 125 selectively toward and away from the air inlet opening 124 and an inclined trumpet plate 127, which projects downwardly from the top of housing 11 forwardly of the opening 124.

Journaled in housng 11 adjacent the upper end of apron 102 to rotate in spaced, parallel relation to the roll 105 at one side thereof (the left side as shown in FIG. 3B), is a conventional stripper roll 130, which has in its outer surface the usual, radially projecting pins 131. Journaled in the upper end of housing 12 to rotate parallel to the stripper roll 130 between the trumpet plate 127 and a partition 132 which projects downwardly from the top of housing 12 forwardly of the opening 124 is a doffing roll 133. This roll has in its periphery a plurality of spaced ribs 134 that are designed to direct incoming fibers downwardly into the air bridge 13 as described in greater detail hereinafter.

The rolls 105, 130 and 133 are adapted to be rotated in unison by a motor 135, which is mounted on top of the housing 11 adjacent the plenum 120. The drive shaft of motor 135 is connected by a chain 136 and sprocket wheel (not illustrated) to the stripper roll 130 to rotate this roll in the direction indicated by the associated arrow in FIG. 3. In turn, the stripper roll 130 is drivingly connected by chains 137 and 138 and sprocket wheels (not illustrated) to the rolls 105 and 133, so that when the motor 135 is energized, the rolls 130, 105, and 133 are rotated in the directions indicated by their associated arrows in FIG. 3B.

The doffing roll 133 overlies an inclined fiber deflection plate 141 (FIG. 3B), which is secured along its upper edge to a pivotal shaft 142. Shaft 142 is journaled in opposite sides of housing 12 to extend beneath the lip of an inclined trumpet plate 143 which extends from housing 11 adjacent the upper end of the apron 102 into the rear end of housing 12. Two control arms, one of which is denoted at 145 in FIG. 3B, are attached to opposite ends of shaft 142 at the exterior of housing 12 for manual adjustment into different angular positions in which they are held releasably by pins (not illustrated) engageable in registering openings formed in the arms and in associated adjusting blocks 146 (only one of which is shown in FIG. 3B), which also are fastened on the outsides of housing 12.

Figure 1:
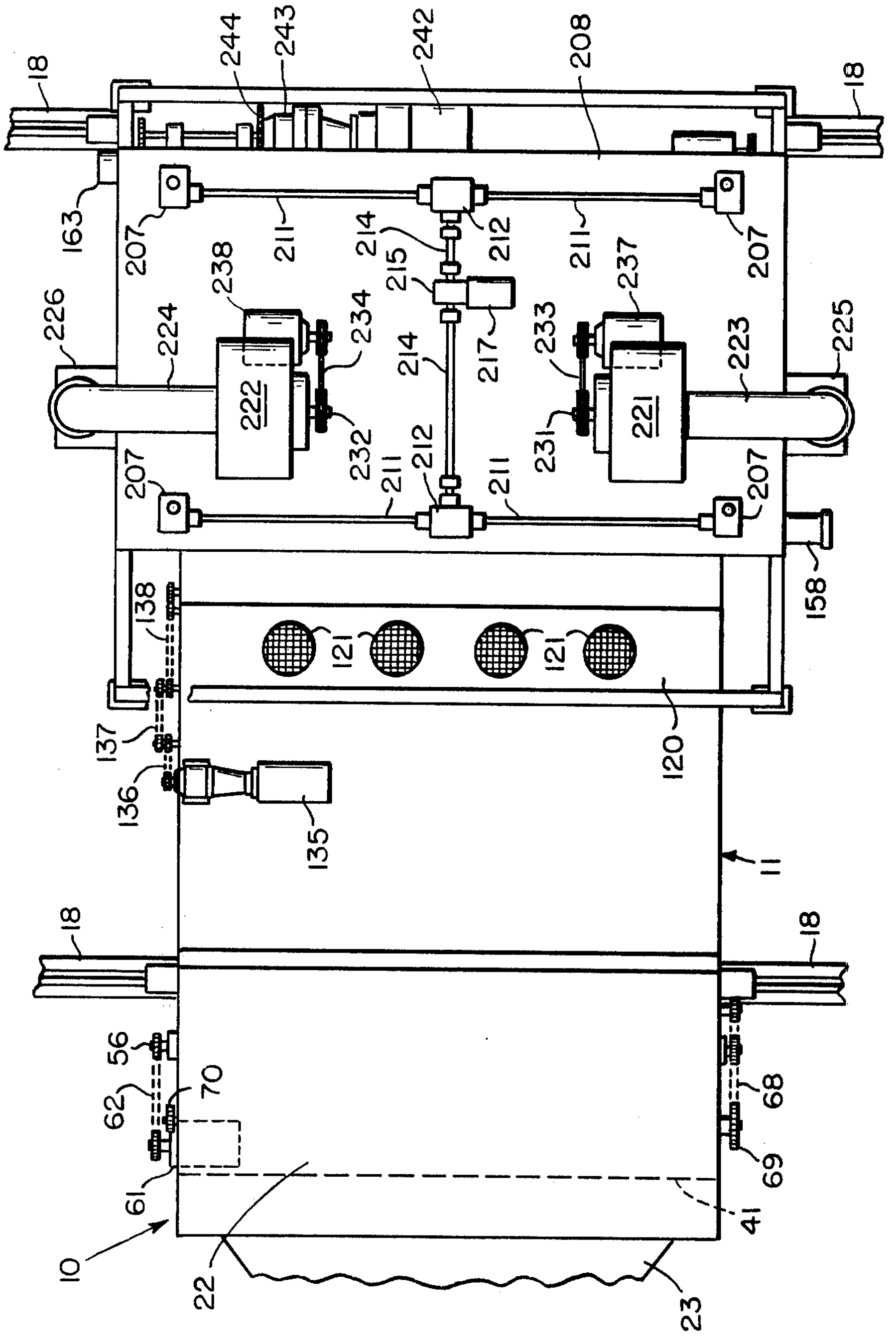
FIG. 1 is a fragmentary plan view of a machine made according to one embodiment of this invention for forming lignocellulosic fiber mats.

The lower edge of plate 141 overlies a chute 148 which extends from plate 106 downwardly over the rear end of the lower condenser 15. In the embodiment illustrated, condenser 15 comprises an endless, foraminous belt or screen 151, which is mounted to travel in an endless path about a first pair of rolls 152 and 153, which are journaled in opposite sides of housing 12 for rotation about horizontal axes, and around a third roll 154, which is adjustably mounted in opposite sides of housing 12 to maintain tension in belt 151. Rolls 152 and 153 are positioned so that the upper reach of belt 151 travels from the left to the right in FIG. 3B horizontally across a support plate 155, and beneath a leveler roller 156, which is journaled in opposite sides of housing 12 to rotate in the lower end of air bridge 13 for a purpose noted hereinafter. The rear condenser roll 152 is positioned beneath the lower end of chute 148 in engagement with a cylindrically shaped brush 157, which is journaled in opposite sides of housing 12 to be driven by a motor 158 (FIG. 1). Leveller roller 156 is driven by a separate motor, not illustrated.

The forward or drive roll 153 for condenser 15 rotates beneath a horizontal discharge plate 161 (FIG. 3B), which extends across the front of frame 12, and is connected by a sprocket wheel (not illustrated) and chain 162 to a lower condenser drive motor 163 (FIGS. 2 and 3B), which is mounted at one side of housing 12 adjacent its forward end.

The upper condenser 14 comprises a pair of side panels or plates 171 and 172 (FIG. 3B), which are generally rectangular in configuration adjacent their rear ends, and tapered to rounded points at their forward ends. These side plates are secured to opposite ends of a pair of tubular, transversely extending beams 173 and 174, and to a relatively large, transversely extending housing 175. Journaled at opposite ends in the plates 171 and 172 adjacent their corners are four, parallel idler rolls 176, 177, 178, and 179. Opposite ends of a further roll 180 are journaled between the forward rounded ends of plates 171 and 172 adjacent a cylindrical brush 181, which is rotated in operative relation to roll 180 by a motor 189 (FIG. 2). An endless perforated belt or screen condenser 182 is mounted to travel in continuous path around the outside of idler rolls 176 to 179 and the roll 180, which is driven as noted hereinafter.

The plates 171 and 172 are fastened adjacent opposite ends thereof to the lower ends of two pairs of vertically disposed legs or hangers 184 and 185. (Only one leg 185 is shown in FIG. 3B). At their upper ends legs 184 and 185 are secured to a pair of spaced, parallel, shafts 186, which are supported at opposite ends on two sets of grooved rollers 187 and 188. These rollers are mounted to roll on a pair of tubular, parallel supporting beams 190 and 191, which extend transversely across the machine adjacent opposite ends of the upper condenser. Brackets 183 releasably secure the legs 184 and 185 to the beams 190 and 191; and opposite ends of the shafts 186 are releasably secured by two pairs of torsion arms or clamps 193 to the outsides of the beams 190 and 191, respectively, normally to secure the rollers 187 and 188 against movement on these beams.

Beams 190 and 191 form part of a rigid hanger frame having transversely extending front and rear panels or walls 195 and 196 (FIG. 3B), respectively. Two pairs of spaced, parallel side webs or flanges 197 and 198 project toward each other from the walls 195 and 196, respectively, and are secured at their inner ends to the beams in spaced, parallel relation between the walls 195 and 196.

Adjacent their upper edges walls 195 and 196 are secured to the outer surfaces of two, tubular, transversely extending beams 201 and 202, respectively, which form part of a rectangular frame that is connected by four shackles 203 to the lower ends of four vertically disposed, generally rectangularly spaced jacks 205. The upper ends of these jacks extend through the bores of four drive nuts (not illustrated), which are rotatably journaled in a conventional manner in four housings 207 that are fastened on a rectangular, horizontally disposed plate 208, which is supported by a plurality of beams 209 on top of frame 12. In each housing 207 the drive nut (not illustrated) has on its outer periphery a plurality of gear teeth (not illustrated), which are drivingly engaged with the teeth of a cooperating gear (not illustrated), which is attached to one end of four shafts 211 (FIG. 1). The opposite ends of these shafts are connected through gears (not illustrated) in a pair of housings 212 with a pair of coaxially disposed drive shafts 214, which are connected by a conventional gear mechanism 215 with the armature or drive shaft of an electric motor 217. This motor, which is also mounted on plate 208, is operable selectively to effect the raising or lowering of the upper condenser 14 as noted hereinafter.

The actual driving connections between the jacks 205 and the motor 217 may be of any conventional design, and therefore have not been described nor illustrated in detail herein. For example, assuming that the motor 217 is a reversible motor, the mechanism connecting this motor to the jacks 205 need only be operative to drive the jacks simultaneously downwardly and at the same speed, when the motor 217 is rotated in one direction and to drive the jacks 205 simultaneously upwardly at the same speed, when the motor 217 is driven in the opposite direction.

Also mounted on plate 208 adjacent opposite sides thereof are two, spaced suction fans 221, and 222, the inlet sides of which face outwardly and are connected by ducts 223 and 224 (FIG. 1 and 2), respectively, with plenums 225 and 226, which open on opposite sides, respectively, of the lower condenser 15 between its upper and lower runs. These two plenums communicate through a large rectangular opening 227 in the plate 155 with the space between the upper and lower condensers 14 and 15, thereby operatively connecting the space between the inlet ends of the condensers with the inlet sides of the fans 221 and 222. The impellers (not illustrated) for the fans 221 and 222 are fastened to shafts 231 and 232, respectively, which have thereon pulleys that are drivingly connected by belts 233 and 234, respectively, to pulleys that are fastened to the drive shafts or armatures of motors 237 and 238, respectively. These motors are mounted on plate 208 adjacent the respective fans 221 and 222.

Mounted on the front wall 195 of the hanger unit is the upper condenser drive motor 242 (FIGS. 1, 2 and 3B). The armature or drive shaft of this motor is connected through a conventional speed reduction unit 243(FIGS. 1 and 2) and a sprocket wheel 244 with a chain 245. This chain passes around an idler sprocket 246(FIG. 3B), which is adjustably mounted on the wall flange 197, and around a further sprocket wheel (not illustrated), which is attached to one end of the drive roll 180 for the upper condenser belt or screen 182. When motor 242 is energized, roll 180 is driven counterclockwise about its axis as shown in FIG. 3B. The rotation of drive roll 180 is transmitted to belt 182, which in turn imparts rotation to idler rolls 176–179 in the directions illustrated by the associated arrows in FIG. 3.

Normally the hanger wall 196 is releasably secured by bolts to the partition 132 on frame 12. Before the machine is placed in use, these bolts can be removed temporarily, and by a control mechanism which forms no part of this invention, the upper condenser 14 can be positioned vertically by its jacks 205 relative to the lower condenser 15. The control mechanism operates motor 217 until the confronting runs of the upper and lower condenser screens 182 and 155 are positioned the desired distance apart. Thereafter the hanger wall 196 is again bolted to the partition 132.

In use all of the motors 61, 88, 98, 135, 163, 238, and 242, are started. Motors 163 and 242 are coordinated so that the confronting runs of the upper and lower condensers travel forwardly at the same speed. Resin treated lignocellulosic fibers are then conveyed from a pneumatic fiber feeding system of any conventional design into the fiber inlet 24, from where the air-borne fibers pass downwardly through the opening 26 in duct 22 into the separator housing 21 adjacent the rotating doffing rolls or wipers 31 and 32. At this time the conduit 50 is connected to a vacuum or suction supply, which causes air, dust and small particles to be drawn from the falling fibers in housing 21 rearwardly around the doffers 31 and 32 and through the perforations in the separator plates or partitions 41 and 42 to the discharge chamber 48. From here the dust is exhausted through outlet 50 to a baghouse filter, or the like, at some remote collection point.

The fibers passing downwardly through housing 21 are not condensed against any surface where pilling, rolling or lumping can occur. Nor do the falling fibers form large clumps, which often occur when fibers are separated from an air stream by deposit on a condensing screen or filter. Any large particles which may tend to collect on the partitions 41 and 42 are wiped therefrom by the rotating doffers 31 and 32, and are discharged together with the remaining fibers downwardly onto the top of the rotating vacuum drum 55, which simultaneously agitates and discharges the fibers downwardly into the hopper 74.

The motor 88, which drives the fiber metering or beater rolls 76 and 77, is adapted to be connected to a conventional level sensing mechanism (not illustrated) which controls the level of the fiber supply contained in housing 11 above the floor apron 91. Assuming that this sensing mechanism has energized the motor 88, the rotating beater rolls 76 and 77 feed fibers downwardly from the hopper onto the apron 91, simultaneously breaking up any clumps or lumps of fibers which may have survived the separator section 10.

Fibers are then carried by the moving floor apron 91 to the inclined elevator apron 102, the pins 108 of which gather the fibers and bear them upwardly toward the stripper drum 130. The pins 131 on this rotating drum prevent any undesirable balling up or accumulation of fibers on the apron 102, so that a uniform supply of fibers is conveyed by the apron over the top drum of 105 and beneath the pleunum 120. The excess fibers removed by the stripper drum 130 are discharged backwardly into the feed section toward the rear of the hopper. This constant movement of the fibers by the apron 91, apron 102, and stripper roll 130 reduces the possibility of any undesirable accumulation of dense masses of fibers in the hopper or feeder section.

The fibers carried by apron 102 over the top of roll 105 are exposed to the influence of the stream of air which enters through the inlet 24 and passes over the lip of the throttle plate 125. As this stream of air enters the expansion chamber formed in the rear of housing 12, it draws fibers from the pins of apron 102 and discharges them toward the rotating doffing roll 133. The ribs 134 on this roll discharge the fibers downwardly across plates 143 and 141 toward the rear end of the lower condenser 15. The effect of the air entering the plenum 120 through the opening 124, combined with the suction created at the opening 227 in plate 155, generates at 13 an air bridge, which causes the fibers entering the rear of housing 12 to pass beneath the leveling roll 156, and to collect uniformly across the width of the wedge-shaped space formed between the belt 151 and the rear end of the upper condenser belt 182. (As shown in FIG. 3B the rear portion of belt 182 is inclined slightly to the horizontal.)

It is essential that the space between these two belts rearwardly of opening 227 be sealed, and for this purpose a sealing plate 251, which overlies the leveler roll 156, has along one edge thereof a flexible sealing strip 252, which has sliding engagement with the belt 182 to seal part of the throat of the air bridge. Also, two spacer plates, only one of which is illustrated at 253 in FIG. 3B, are releasably secured to the outsides of the upper condenser walls 171 and 172 to enclose opposite sides of the air bridge between the condensers, so that a vacuum can be developed in the throat of the bridge by the fans 222 and 223. This vacuum draws the fibrous material from the expansion chamber and partially compacts it under the suction pressure within the wedge or throat section of the air bridge 13 where the latter opens on the space between the confronting runs of the two condensers 14 and 15. Moreover, since these two runs travelling forwardly, or toward the right in FIG. 3B, the partially compacted fibers are further compacted as they pass beyond the opening 227, and beneath the forward portion of the belt 182, which extends parallel to the section of belt 151 that passes over support plate 155. A compacted mat is thus conveyed by the two condensers 14 and 15 across the discharge plate 161 and out of the forward end of the machine in a continuous manner, as long as fibers are continuously fed into the air bridge 13.

From the foregoing it will be apparent that the instant invention provides an extremely reliable and versatile machine for continuously forming lignocellulosic fiber mats, which can be severed and treated to form wooden fiberboard in known manner. Although it is not absolutely necessary to use the separator section 10, the separator does increase the effectiveness and efficiency of the machine by removing any undesirable dust and small particles from the fibers before they are fed to the hopper section of the machine. This is important because all fibrous material must be supplied free of tramp metal and undesirable contaminates which might otherwise have a deleterious effect on the resultant fiberboard. The spiked metering rolls 76 and 77 in the hopper section of the feeder tend to beat and further separate the fibers as they are discharged downwardly onto the floor apron 91. Moreover, a nozzle 260 (FIG. 3A), which is mounted on the housing 11 beneath the feeder rolls 76 and 77, is adapted to be connected to a supply of liquid which can be discharged into the falling fibers, as desired, to help control dust and static electricity.

The flow of air through the pleunum 120 to the air bridge can be controlled by adjustment of the throttle plate 125. Moreover, the suction generated by the fans 222 and 223 can be controlled accurately by dampers (not illustrated), which are located in each duct 223 and 224 intermediate its ends. In addition the deflector plate 141 can be adjusted by its handles 145 to direct the flow of fiber into the air bridge 13 in the mat formation unit. Once a suitable position for this deflector plate has been found for a particular type of fiber, there should be no further need for its adjustment.

Still another advantage of this construction is that the upper condenser 14 can be readily removed from the housing 12 for repair, or the like, merely by removing the links 193 and the angle brackets 183, which connect the roll-out beams 190 and 191 to the hanger brackets 184 and 185, and then inserting extension members into the tubular beams 190 and 191 at one side or the other of the machine. The rollers 187 and 188 can then be rolled outwardly onto the extension members to convey the upper condenser 14 to one side or the other of the machine.

The output of this machine is measured volumetrically in the air bridge 13 where the fiber is compacted under steady flow conditions. The packing pressure is dependent upon the intensity of the suction pressure in the throat of the air bridge, which in turn is directly related to the static pressure of the air flow through the bridge. When the belts of the upper and lower condensers are not travelling, the fibers will tend to pack into the throat of the air bridge and back up until the suction at the opening 227 is no longer effective. Thus, by controlling the surface speed of the condensers 14 and 15, by increasing or decreasing the suction at the opening 227, and by varying the distance between the upper and lower condensers, the output of the machine will be effected.

Two typical formulas for determining the production or rating of such a machine are as follows:

1. Pounds of production per hour .

Multiply ounces of fibers per square feet times the width of the machine in feet times the forming speed in feet per minute times 3.75.

2. Square feet of production per hour

Multiply the width of the machine in feet by the forming speed in feet per minute, multiplied by 60.

The filler strips 253, which are releasably attached to opposite sides of the upper condenser 14, come in different sizes, so that whenever the upper condenser 14 is raised or lowered by its associated jacks 205 a different set of filler strips 253 must be attached to the upper condenser to seal opposite sides of the throat or space between the inlet ends of condensers 14 and 15.

While this method and machine have been described in connection with the use of resin treated lignocellulosic fibers, it will be readily apparent to one skilled in the art that the invention could be practiced by preparing mats made from other types of fibers or blends thereof. Also, while the condensers 155 and 182 have been described as being perforated belts or screens, it is apparent that this is necessary at least for the belt which overlies the suction source represented by fans 221 and 222. Moreover while only a single embodiment of this invention has been described in detail herein, it will be apparent that this application is intended to cover any such modifications of the method and machine as may fall within the scope of one skilled on the art or the appended claims.

I claim:

1. A machine for forming fiber mats, comprising a housing having therein a chamber, a pair of endless belt members, means mounting said members on said housing for travel in endless paths adjacent said chamber and with respective runs thereof disposed in spaced, confronting relation.

means for feeding fibers into the upper end of said chamber, means connecting an opening in the lower end of said chamber with one end of the space formed between said confronting runs of said belt members, means for creating a vacuum in said space adjacent said one end thereof whereby fibers in said chamber are drawn by suction through said opening into said one end of said space, said mounting means supporting confronting portions of said belt members for travel along converging paths adjacent said one end of said space, and for travel along parallel paths adjacent the opposite end of said space, and means for driving said members so that said confronting runs thereof travel at the same rate from said one end toward the opposite end of said space, whereby fibers entering said one end of said space are compacted between, and conveyed by, the confronting runs of said members from said one to the opposite end of aid spaced where they are discharged in the form of a fiber mat.

2. A machine as defined in claim 1, wherein at least one of said belt members comprises a perforated screen condenser, and said vacuum creating means comprises a suction supply communicating through the perforations in said screen condenser with said one end of the space between said confronting runs of said members.

3. A machine as defined in claim 2, wherein said screen condenser has a horizontal run extending at one end beneath the opening in said lower end of said chamber, and at its opposite end beneath the confronting run of the other of said belt members, and said confronting run of said other belt member has a first portion adjacent said one end of said space inclined to the plane of said horizontal run of said condenser, and a second portion adjacent the opposite end of said space extending parallel to said horizontal run of said condenser.

4. A machine as defined in claim 3, wherein said mounting means includes means supporting said other belt member on said housing above said condenser, and means for adjusting said supporting means on said housing selectively to raise and lower said other belt member relative to said condenser.

5. A machine as defined in claim 4, wherein said supporting means includes a pair of stationary rails extending transversely of said housing adjacent opposite ends of said other belt member, and adjustable vertically by said adjusting means, a frame supporting said other belt member for travel in its endless path above said condenser, and means releasably supporting said frame for rolling movement on said rails between an operative position above said condenser, and an inoperative position in which it is located laterally to one side of said housing.

6. A machine as defined in claim 3, wherein a rigid plate is positioned beneath and parallel to said horizontal run of the condenser to support said horizontal run for sliding movement thereon, said plate has an opening therethrough adjacent said one end of said space, and said suction supply comprises at least one suction fan having its intake connected to said opening in said plate to create a vacuum in said one end of said space.

7. A machine as defined in claim 1, wherein said fiber feeding means comprises a second housing attached to the first-named housing and having therein a hopper section for receiving and storing a supply of fibers.

conveying means in said second housing for conveying fibers from said hopper section into said chamber in said first-named housing adjacent the upper end thereof, and means including an air plenum mounted on at least one of said housings for directing a stream of air downwardly through an opening in the upper end of said chamber to create between said plenum and said vacuum creating means an air bridge which causes the fibers entering said chamber to be drawn downwardly through the opening in the bottom of said chamber and into said one end of the space between said confronting runs.

8. A machine as defined in claim 7, wherein the last-named means further includes an adjustable throttle plate mounted in one of said housings for adjustment relative to an opening formed in one of said housings between said plenum and said chamber adjustably to control the amount of air admitted to said chamber from said plenum.

9. A machine as defined in claim 7, including a doffing roll mounted to rotate in the upper end of said chamber tangentially of said stream of air and having on its periphery a plurality of angularly spaced, radial projections for directing incoming fibers downwardly in said chamber.

10. A machine as defined in claim 9, wherein said conveying means comprises an apron mounted in said second housing to travel in an endless path inclined to the vertical, and having thereon a plurality of pins for conveying clusters of fibers upwardly from the bottom of said hopper section and into the upper end of said chamber in said first-named housing.

a stripper drum is mounted in said second housing to rotate adjacent the upper end of said apron to comb the clusters of fibers on said apron prior to the discharge of the fibers into said chamber, and the upper end of said apron being positioned beneath said opening in the upper end of said chamber, and in the path of said air stream so that fibers are doffed by said stream from said apron after passing said stripper drum.

11. A machine as defined in claim 7, including means for supplying fibers to said hopper section of said second housing, comprising a separator unit mounted on said second housing and having an inlet duct in its upper end for connecting the unit to a supply of fibers of the type that are conveyed by a stream of air from said supply to the inlet duct of said unit, a perforated partition in said unit separating the interior thereof into a first vertical chamber communicating at its upper end with said inlet duct and at its lower end with said hopper section of said second housing, and a second vertical chamber sealed at its upper end and connected adjacent its lower end to a source of suction, a doffing roll mounting in said first vertical chamber to rotate adjacent said partition, and in the path of fibers discharged into the upper end of said first vertical chamber from said inlet duct, and means for rotating said doffing roll, said partition being segmental cylindrical in cross section, and said doffing roll having on its periphery a plurality of spaced, flexible wiper blades which have wiping contact with the concave surface of said partition, when said roll is rotating.

12. A machine as defined in claim 11, including a pair of metering rolls mounted in said second housing adjacent the upper end of said hopper section to rotate in spaced, parallel relation, and forming therebetween a nip which registers with a discharge opening in the bottom of said separator unit, and means for rotating said metering rolls in opposite directions to feed fibers downwardly between said metering rolls toward the bottom of said hopper section.

13. A machine as defined in claim 12, wherein said means for conveying fibers to said chamber in said first-named housing comprises a floor apron mounted in the bottom of said second housing to travel in an endless path, and having an upper, fiber conveying run positioned at one end beneath said metering rolls, and a second apron mounted in said second housing to travel in an endless path inclined to the vertical, said second apron having its lower end positioned above said floor apron adjacent the end thereof remote from said metering rolls, and having its upper end positioned beneath said plenum and in communication with the upper end of said chamber in said first-named housing.

14. A machine for forming fiber mats, comprising a housing having in one end an expansion chamber two sides of which converge toward an opening which extends transversely across the lower end of the chamber, a pair of endless belt members mounted in said housing to travel in endless paths one above the other, and forming between confronting runs thereof a mat-forming space which opens at one end on said transverse opening in the lower end of said chamber, means mounting said members in said housing with said confronting runs thereof converging from said one end of said space to a point intermediate the ends of said space, and extending parallel to each other from said point to the opposite end of said space, means sealingly connecting the space between said converging runs with said transverse opening in the lower end of said chamber, means for feeding lignocellulosic fibers into said chamber adjacent an opening in the upper end thereof, one of said belt members comprising an endless screen condenser, suction means communicating through the perforations in said condenser with said space between said confronting runs, and operative to cause a stream of air to be drawn through said opening in the upper end of said chamber, and to convey incoming fibers downwardly in said chamber and through said transverse opening to the space between said converging runs, and means of driving said belt members in said endless paths with the confronting runs thereof travelling at the same rate and in the same directions from said one to the opposite end of the space between said runs, whereby fibers entering said one end of said space are progressively compacted between said converging runs and discharged as a fiber met from between said parallel runs at said opposite end of said space.

15. A machine as defined in claim 14, including means for adjusting the space between said belt members selectively to vary the thickness of the mat discharged from between said parallel runs.

16. A machine as defined in claim 15, wherein said connecting means comprises a pair of plates removably secured to said housing at opposite sides, respectively, of the space between said confronting runs, and operative to seal opposite sides of the last-named space between said transverse opening in said chamber, and said point intermediate the ends of the space separating said confronting runs.

17. A machine as defined in claim 15, wherein said adjusting means comprises a plurality of vertically adjustable jack members mounted on said housing, means supporting the upper of said two belt members on said jacks for vertical adjustment thereby relative to the other belt member, and means for simultaneously adjusting said jack members selectively to raise or lower said upper belt member on said housing.

18. A machine as defined in claim 14, wherein both of said belt members are endless screen condensers, one of said screen condensers has a horizontally disposed run extending at one end beneath the transverse opening in the bottom of said chamber, and extending at its opposite end beneath the other of said screen condensers, said other screen condenser has a lower run positioned above and confronting said horizontal run of said one condenser, said lower run having a portion thereof adjacent said chamber inclined to said horizontal run and having the remaining portion thereof extending parallel to said horizontal run, and said suction means comprises at least one suction fan mounted on said housing and having its inlet communicating through the openings in said horizontal run of said one condenser with the space between the last-named run and said inclined portion of the lower run of said other condenser.

* * * * *